Oct. 13, 1964

W. E. HEESE 3,152,520

THREE POSITION ACTUATOR

Filed April 5, 1961

INVENTOR.
WILLIAM E. HEESE
BY
Brumbaugh, Free, Graves & Donohue
his ATTORNEYS

Oct. 13, 1964

W. E. HEESE 3,152,520

THREE POSITION ACTUATOR

Filed April 5, 1961

INVENTOR.
WILLIAM E. HEESE

BY Brumbaugh, Free, Graves + Donohue his ATTORNEYS

United States Patent Office 3,152,520
Patented Oct. 13, 1964

3,152,520
THREE POSITION ACTUATOR
William E. Heese, Old Saybrook, Conn., assignor to General Dynamics Corporation, New York, N.Y., a corporation of Delaware
Filed Apr. 5, 1961, Ser. No. 100,860
3 Claims. (Cl. 92—52)

This invention relates to a fluid operated actuator and, in particular, to a fluid operated actuator selectively operable to three positively indexed positions.

Fluid operated mechanical actuators, which have been adapted for use with many devices, for example valves, combine ruggedness and reliability with high torque output when supplied with suitable fluid pressures such as found in hydraulic systems. While most actuators positively operate their output members to two indexed positions, it is often desirable to operate a mechanical device to three positions.

The present invention provides a fluid operated unit that actuates its output member to three positively indexed positions. To this end, a preferred embodiment of the invention includes a housing in which a tubular cylinder, having a port at one end, moves between two positions. A piston in the cylinder, carrying an actuating pin extending out of the cylinder, is limited in movement by an abutment formed in the cylinder. A pair of ports, respectively communicating with a chamber at the ported end of the cylinder and with the interior of the cylinder, are adapted to be connected to fluid supply and return ducts for operating the actuating pin to a selected one of its three positively indexed positions.

These and further advantages of the invention will be more readily understood when the following description is read in conjunction with the accompanying drawings, in which.

Figure 1:
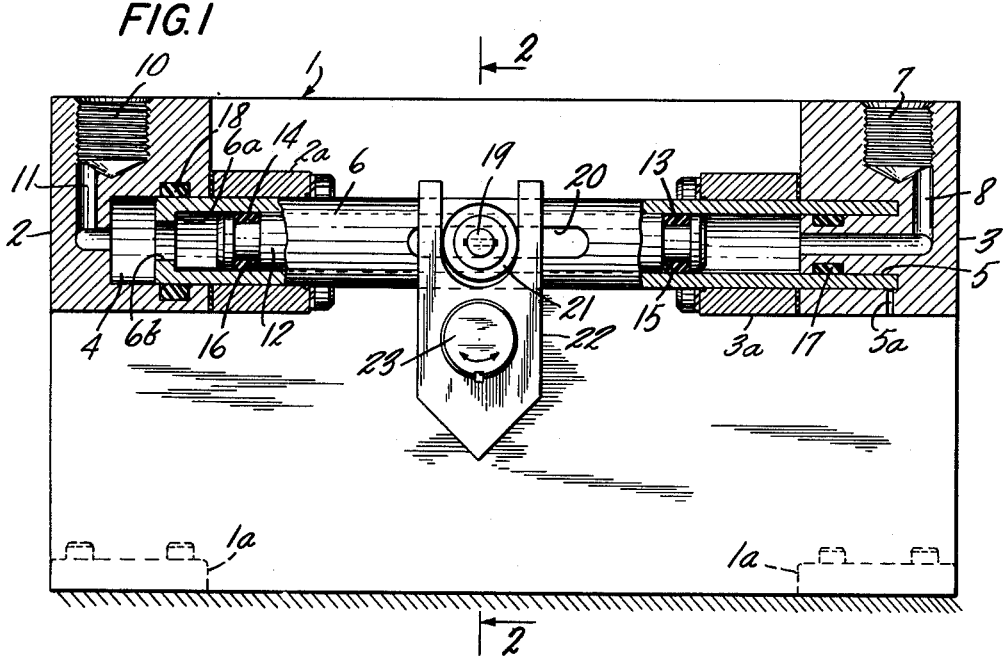
FIGURE 1 is an elevation, partly in section, of a fluid operated actuator constructed in accordance with the invention.
Figure 2:
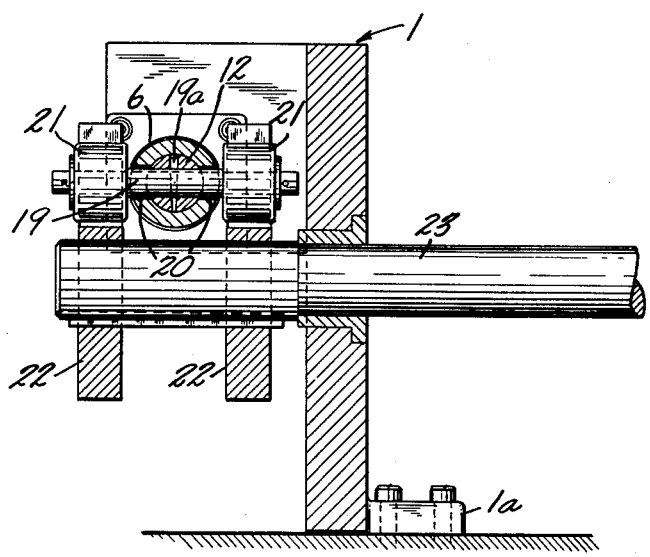
FIGURE 2 is a transverse section of the actuator of FIGURE 1 taken along the view line 2—2 looking in the direction of the arrows.

Referring to a typical embodiment of the invention in greater detail with reference to the drawings, the actuator shown in FIGURES 1 and 2 includes a housing formed by a plate 1 to which are attached suitably bored blocks 2 and 3. Appropriate mounting flanges 1a on the plate 1 are used to fasten the actuator to a valve to be operated, for example. A cylindrical chamber or recess 4 in the block 2, elongated by a sleeve 2a suitably fastened to the block, is aligned with an annular recess 5 in the block 3, also provided with an attached sleeve 3a. A passage 5a vents the recess 5.

A tubular cylinder 6 has one end slidably received in the cylindrical recess 4 and its other end slidably received in the annular recess 5. The block 3 incorporates a port 7 connected by a passage 8 to the interior of the cylinder 6 while the block 2 includes a port 10 connected by a passage 11 to the recess 4 and one end of the cylinder 6. The spacing of the blocks 2 and 3 and the length of the cylinder 6 permit limited endwise movement of the cylinder between two positions in the chambers 4 and 5.

A floating piston 12, slidably mounted in the cylinder 6, carries O-rings 13 and 14 in annular grooves 15 and 16 adjacent to its outer ends sealably to engage the cylinder interior. A shoulder 6a formed on the cylinder 6 provides a port 6b of lesser area than the piston 12 leading to the cylinder interior.

To prevent fluid leakage during movement of the cylinder 6, an O-ring 17 is disposed in a groove in the inner wall of the annular recess 5 and an O-ring 18 in a groove in the wall of the cylindrical recess 4. Other suitable sealing devices may be provided to minimize loss of fluid from the actuator.

An actuating pin 19 extends through the piston 12 and out of the cylinder 6 through a pair of slots 20 extending lengthwise in the walls of the cylinder. A locking pin 19a holds the pin 19 securely in the piston 12. An abutment provided by the ends of the slots 20 or the shoulder 6a, or both, limits movement of the piston 12 toward the left hand end of the cylinder 6.

The pin 19 carries, at its outer ends, cam rollers 21 cooperating with forked arms 22 that are keyed to an output shaft 23. Due to the difference in lever arms, a much greater torque is applied to the shaft 23 when the arm 22 is in its 0° position (FIGURE 3) than when the arm is in the transitory position shown in FIGURE 1.

Figure 3:
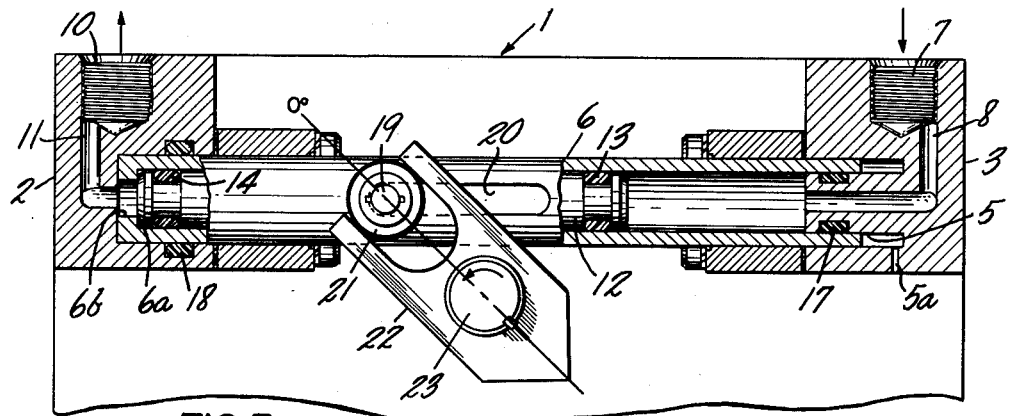
FIGURES 3, 4 and 5 illustrate the actuator, partly in section, in its three positively indexed positions.
Figure 4:
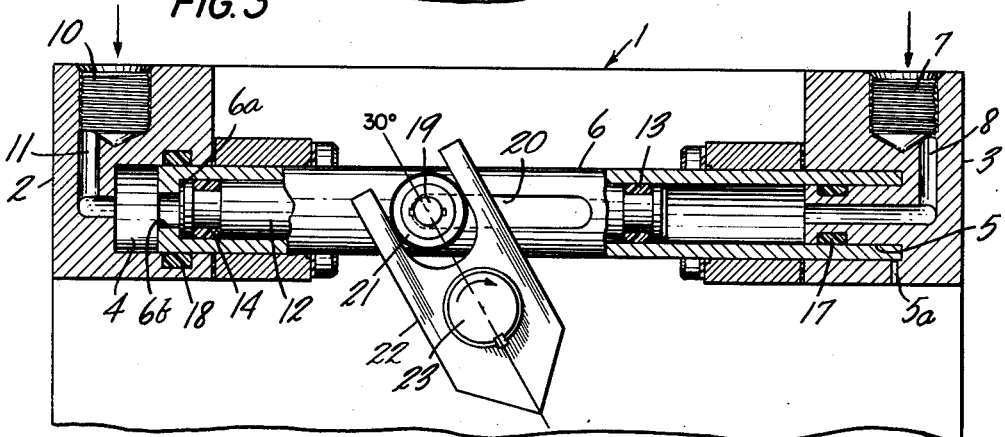
Figure 5:
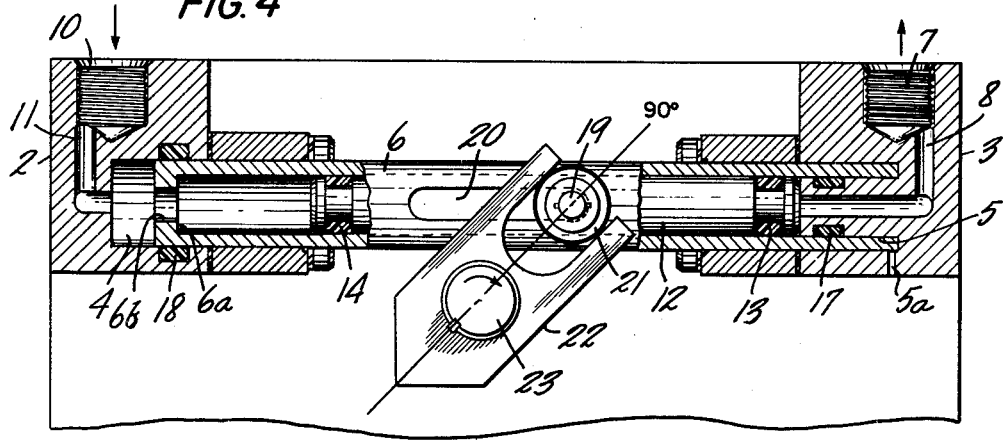

The operation of the actuator will be readily understood by referring to the schematic diagrams of FIGURES 3, 4 and 5 which illustrate the three positively indexed positions to which fluid pressure moves the actuating pin 19 and output shaft 23. In the embodiment illustrated, the output shaft 23 is rotated to 0°, 30° and 90° in response to supply and return fluid pressures applied to ports 7 and 10. These positions are indicated by way of example since the shaft 23 may be rotated by the pin 19 to three other angular positions by varying the lengths of the cylinder 6 and piston 12 and the travel of the piston in the cylinder.

Referring first to FIGURE 3, which shows the output shaft member 23 at the 0° position, operating fluid under pressure is applied to port 7, the port 10 being connected to a fluid return, as designated by arrows, to urge the floating piston 12 to its extreme left hand position. The piston 12 in so moving will engage the shoulder 6a at the left hand end of the cylinder 6 and force the cylinder to the end of the recess 4. Accordingly, the pin 19 in the piston 12 moves in the slots 20 to a position in which the forked arm 22 and the output shaft 23 are driven to the 0° position. Since the lever arm between the pin 19 and shaft 23 is much greater in this position than when the arm 22 is in the transitory position shown in FIGURE 1, actuation of the pin 19 to the right creates a much greater torque on the shaft 23.

When it becomes desirable to operate the output shaft 23 to its 30° position, as shown in FIGURE 4, fluid under pressure is applied to both ports 7 and 10 to urge the cylinder 6 toward the right and the piston 12 toward the left. Since the fluid pressure in the chamber 4 acts on a greater area (the cylinder 6) than the area acted upon by the fluid pressure in the interior of the cylinder (the piston 12), the cylinder will be urged to the right and the shoulder 6a will force the piston 12 and the pin 19 to the right until the end of the cylinder engages the bottom of the annular recess 5.

Finally, to rotate the output shaft member 23 to its 90° position, as shown in FIGURE 5, fluid under pressure is applied to port 10 and the port 7 is coupled to the fluid return to urge the cylinder 6 toward the right into engagement with the bottom of the annular recess 5. The pressure at port 10 also forces the piston 12 to its extreme right hand position. Thus, the roller 21 will be moved to its extreme position at the right to cause the forked arm 22 to move the shaft 23 to its 90° position.

While I have described above a typical three position actuator embodying the principles of the invention, it will be understood that this description is made only by way of example and modifications thereof will occur to those skilled in the art. Therefore, the invention is not to be limited to the specific apparatus disclosed herein but is to be defined by the appended claims.

I claim:

1. A fluid operated three position actuator comprising a housing, first and second fluid ports in the housing adapted to be subjected to fluid pressure, chamber means in the housing, a tubular cylinder movable between two positions in the chamber means, a piston slidably fitted in said cylinder, first fluid passage means providing communication between the first port and one end of the movable cylinder, an actuating pin carried by the piston and extending out of the cylinder, an abutment in the cylinder limiting movement of the piston towards the one end of the cylinder, second fluid passage means providing fluid communication between the second port and the interior of the movable cylinder on the other end of the cylinder, whereby selective application of fluid pressure to the first and second ports will cause movement of the actuating pin to three positively indexed positions.

2. In a fluid operated actuator, a housing, first and second fluid ports in the housing adapted to be subjected to fluid pressure, chamber means in the housing, a tubular cylinder movable between two positions in the chamber means, a piston slidably fitted in said cylinder, first fluid passage means providing communication between the first port and one end of the movable cylinder, an abutment in the cylinder limiting movement of the piston towards the one end of the cylinder, second fluid passage means providing fluid communication between the second port and the interior of the movable cylinder on the other end of the cylinder, whereby selective application of fluid pressure to the first and second ports will cause movement of the piston to three positively indexed positions.

3. A fluid operated three position actuator comprising a housing, first and second fluid ports in the housing adapted to be subjected to fluid pressure, first and second fluid chambers in the housing, a tubular cylinder having first and second ends slidably positioned in the first and second chambers, respectively, a piston slidably fitted in said cylinder, an actuating pin carried by the piston and extending out of the cylinder, first fluid passage means providing communication between the first port and the first chamber to cause the cylinder and piston to move towards the second chamber when fluid pressure is applied to the first port, an abutment in the cylinder limiting movement of the piston towards the first end of the cylinder, second fluid passage means providing communication between the second port and the second chamber to cause the piston to move into engagement with the abutment and urge the cylinder towards the first chamber when fluid pressure is applied to the second port, and the cylinder and chambers being formed to expose the cylinder and piston to fluid pressure in the first chamber and to expose only the piston to fluid pressure in the second chamber to cause the cylinder to move towards the second chamber when equal fluid pressures are applied to both ports.

References Cited in the file of this patent

UNITED STATES PATENTS

| | | |
|---|---|---|
| 812,840 | Field et al. | Feb. 20, 1906 |
| 2,630,132 | Hughes | Mar. 3, 1953 |
| 2,671,431 | Zumbusch | Mar. 9, 1954 |
| 2,806,449 | Simmons | Sept. 17, 1957 |